Oct. 25, 1938.   J. V. H. WHIPPLE   2,134,092
BRAKE TESTER
Filed Dec. 4, 1935
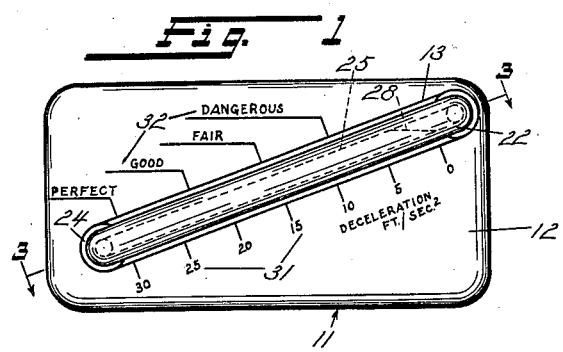
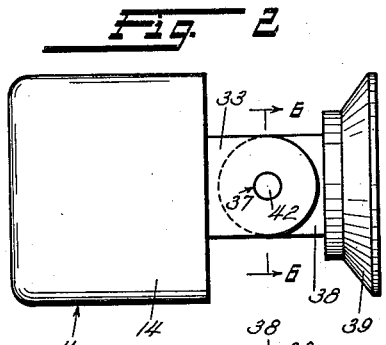
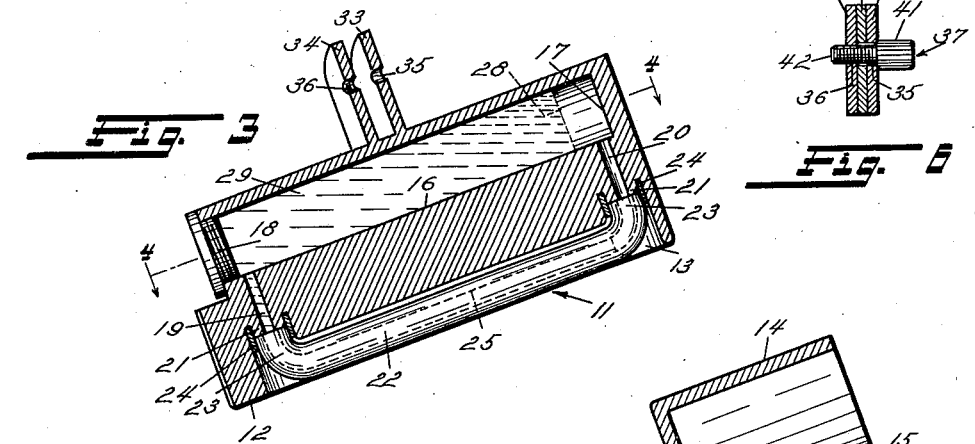
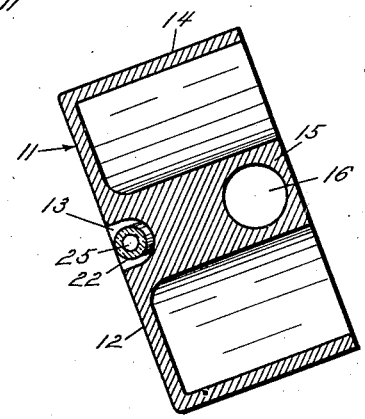
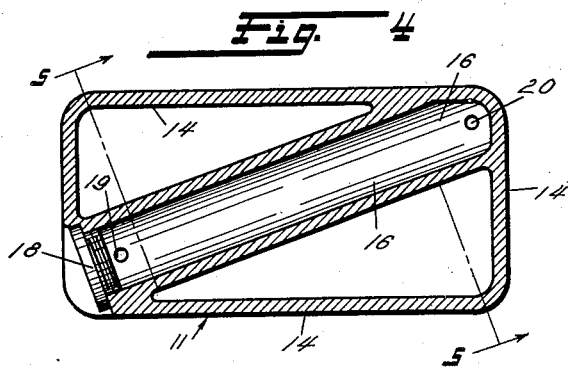
Inventor
Jack Van Horn Whipple
By   Strauch & Hoffman
Attorneys Patented Oct. 25, 1938

2,134,092

UNITED STATES PATENT OFFICE 2,134,092

BRAKE TESTER

Jack Van Horn Whipple, Sellersville, Pa., assignor to United States Gauge Company, Sellersville, Pa., a corporation of Pennsylvania Application December 4, 1935, Serial No. 52,908

2 Claims. (Cl. 264—1)

This invention relates to an instrument for measuring and indicating changes in velocity in order that said instrument may be utilized for the purpose of testing the brakes of a vehicle, for example, though the instrument is useful for other purposes. More particularly, the invention is concerned with an instrument for measuring and indicating changes in velocity in which use is made of a liquid column to attain the purposes of the instrument.

The principal purpose of this invention is to provide an accelerometer or decelerometer, in which use is made of a liquid column as the measuring means, that may be constructed at very low cost and yet will give an accurate and easily readable indication of the rate of change in velocity of a vehicle or the like.

Another object of the invention is to provide an accelerometer or decelerometer in which use is made of a U-shaped column of liquid disposed in an inclined plane so that relatively small changes in the acceleration or deceleration of a vehicle, to which the instrument is applied, will cause a substantial change of liquid level in the leg of the U-shaped column used to furnish the desired indication of acceleration or deceleration.

Still another object of the invention is to form a part of the receptacle for the U-shaped column of liquid as an integral part of the body of the instrument, and to construct only the visible leg of the receptacle from a transparent or translucent material.

The invention also aims to further augment the change in liquid level in the visible liquid column due to the inclination of the column, as above stated, by constructing the visible leg of the column of small cross-sectional area compared to the cross-sectional area of the invisible leg of the column.

Still another object of the invention is to provide an instrument for measuring and indicating deceleration or acceleration designed so that the liquid column may be used to show when the instrument is level, whereby the instrument may be applied to any supporting surface and subsequently leveled by an adjustment included as a part of its construction.

A further object of the invention is to provide an accelerometer or decelerometer of the type utilizing a liquid column including means to dampen objectionable vibrations of the column.

Still further objects of the invention will appear as the description proceeds with reference to the accompanying drawing in which:

Figure 1 is a front elevational view of a preferred embodiment of the invention.

Figure 2 is a side elevational view as seen when viewing Figure 1 from the right thereof.

Figure 3 is a sectional view taken substantially along line 3—3 of Figure 1.

Figure 4 is a sectional view taken substantially along line 4—4 of Figure 3.

Figure 5 is a view taken substantially along line 5—5 of Figure 4.

Figure 6 is a fragmental sectional view taken substantially along line 6—6 of Figure 2.

With continued reference to the drawing in which like reference numerals are employed to denote like parts throughout the several views, the brake tester of the present invention includes a casting 11 having a substantially rectangular face 12 provided with a diagonally extending recess 13 which is inclined at a preferably acute angle relative to the horizontal. Extending rearwardly from the perimeter of casting face 12 is a skirt 14 forming the side walls of casting 11, and extending rearwardly behind the diagonal recess 13 is a ridge 15 which merges at its ends into opposite corners of skirt wall 14. Casting 11 thus takes the form of an open ended box-like structure with a diagonal ridge therein disposed.

Casting ridge 15 adjacent the rear extremity thereof is provided with a chamber or bore 16 parallel to casting face 12, one end of the bore being closed as indicated at 17 and the other end being open to the exterior of the casting and sealed by means of a removable threaded plug 18. Extending forwardly from the ends of bore 16, and parallel to skirt wall 14, are twin passages 19 and 20 of restricted diameter which terminate in nipples 21 formed on the casting at the ends of recess 13.

Positioned in recess 13 is an indicator tube 22 of transparent material such as glass, having rearwardly offset extremities 23 which are sealed in abutting relation against nipples 21 by means of rings 24 of an initially plastic material such as a synthetic resin. The ends of bore 25 in tube 22 are in fluid communication with the forward ends of passages 19 and 20. Bore 25 in tube 22 is of slightly larger diameter than passages 19 and 20, but as seen in Figure 3, is of substantially less diameter than casting bore 16.

From the structure thus far described it will be clear that casting bore 16, restricted passage 19 and tubular bore 25, form a liquid receptacle which is closed to the atmosphere and which, by means of passage 20 is made re-entrant upon itself. The receptacle just described is disposed in a plane inclined at an acute angle relative to the horizontal and is filled to the level indicated at 28 with an indicating liquid 29 which is preferably colored to facilitate observation thereof. Liquid level 28, which is designed to rise and fall within tube 22 in a manner hereinafter set forth, is designed to register with suitable indicia 31 and 32 formed on the casting face 12 adjacent tube 22.

Formed integrally on the back surface of casting ridge 15 and extending rearwardly therefrom is a pair of parallel, vertically disposed lugs 33 and 34 provided with aligned apertures 35 and 36. Lugs 33 and 34 are adapted to be mounted upon a pin 37 supported in a bracket 38 disposed between the lugs and carried by a suction cup 39 which may be secured to a suitable part of the vehicle to be tested. As seen in Figure 6, pin 37 is provided with a knurled head 41 adapted to bear against casting lug 33, and a threaded shank 42 adapted to be screwed into threaded lug aperture 36 for clamping the casting lugs in adjusted position with respect to bracket 38.

The operation of the brake tester is as follows. Suction cup 39 is first mounted at a suitable point upon the frame of the vehicle to be tested with passages 19 and 20 extending in the direction of motion of the vehicle and pin 37 disposed in a horizontal position. In testing automobiles it has been found convenient to mount the suction cup in the vehicle windshield in front of the driver's seat. Casting 11 is then adjusted about pin 37 until the liquid surface 28 registers with the "zero" index on the casting face, under which conditions the casting face 12 will be disposed in a vertical plane and the device will be conditioned to perform a testing operation. Under such conditions the tubes 19 and 20 will be horizontally disposed and extending in the direction of motion of the vehicle, and bores 16 and 25 will be inclined to a horizontal reference plane and extending transversely to the direction of motion of the vehicle.

The vehicle is next accelerated to a suitable testing speed and the brakes applied with constant pressure. In testing automobiles it has been found convenient to accelerate the vehicle to a speed from thirty to forty miles per hour before applying the brakes, and the brakes are applied with the maximum pressure employed in normal use.

As the brakes are applied, the vehicle will decelerate until it is brought to rest. During such deceleration liquid 28 will gradually drop within tube 22 until it comes to rest at a new position and in registration with indicia 31 and 32. The position at which the liquid level comes to rest will be determined by the value of the vehicle deceleration which is in turn determined by the retarding action of the vehicle brakes. Liquid level 28 in registering with indicia 31 and 32 thus gives a direct indication of the vehicle deceleration and braking action, and the indicia may be respectively marked, as shown, in units of deceleration and terms indicating the condition of the brakes.

Liquid level 28 is caused to drop from its "zero" position when the brakes are applied by virtue of the fact that the inertia of the liquid within capillary tube 19, which moves in the direction of vehicle motion, causes the liquid to flow from the tube toward the rear of the instrument where it flows into bore 16. Liquid which flows from the tube into bore 16 is replaced by liquid from tube 22 with consequent dropping of liquid level 28.

As the liquid column is disposed in a plane which is only slightly inclined to the horizontal, it will be seen that liquid in flowing from capillary tube 19 into casting bore 16 need overcome a pressure head in bore 16 which is relatively small due to the small vertical height of the liquid in bore 16. The sensitivity of the instrument is thus increased over the sensitivity which would result from use of a U-tube disposed in a vertical plane. Furthermore, since the U-tube is disposed in an inclined plane, relatively small changes in acceleration of the vehicle will cause substantial changes in the liquid level of indicating tube 22.

As previously described, bore 25 in tube 22 is of substantially less diameter and liquid capacity than casting bore 16 and therefore a slight rise in the liquid level in bore 16 will correspond to a much greater drop in the liquid level 28 in tube 22, the relative diameters of the bores being so designed that liquid level 28 in bore 25 may drop from its "zero" position to the bottom of tube 22 without effecting a sufficient rise in the liquid level of casting bore 16 to cause overflow into capillary tube 20. By virtue of the small liquid capacity of indicator tube 22, displacement of a relatively small volume of liquid from the tube will afford a substantial drop in liquid level 28 and therefore provide amplified indication in registering with indicia 31 and 32.

After the vehicle has been brought to rest, liquid level 28 will be temporarily retained in the position which it assumed when the brakes were applied by virtue of the fact that tube 19, due to its restricted diameter, temporarily restrains liquid from returning to bore 25 from bore 16 when the vehicle is brought to rest and observation of the instrument indication is thus facilitated. Passage 19, due to its restricted diameter, further serves to dampen oscillation of the liquid column when the brakes are applied and to bring the liquid level 28 to rest.

It will be appreciated that when the vehicle is being accelerated to test speed, the converse of the described indicating action will occur and liquid will flow from casting bore 16 through tube 19 into bore 25. Under such conditions liquid level 28 will rise and liquid may overflow through capillary tube 20 back into bore 16. When the vehicle reaches testing speed, and before the brakes are applied, the liquid column is brought to equilibrium with liquid level 28 in its "zero" position.

In order to empty or replenish the supply of liquid in the liquid column, plug 18 is removed from the end of casting bore 16 and access is then had directly to the receptacle containing the liquid column.

Although the illustrated embodiment of the invention has been described as used for the purpose of indicating deceleration or braking action of a vehicle, it is to be understood that the instrument may be utilized as an accelerometer for indicating the "pick-up" of a vehicle and such use of the instrument is embraced within the scope of the present invention.

While in the illustrated embodiment of the invention the tube 22 is straight from end to end, it will be understood that said tube may assume other forms. For example, a short portion between the ends thereof may be disposed horizontally and the remaining portions inclined and disposed diagonally of the casting. It is desirable to provide a horizontally disposed section at the point of the level of liquid when normal operation of the vehicle is occurring, slight departures from normal being thus made plainly visible by a rising or fall of the column into the inclined portions of the tube. Such arrangement is particularly desirable when the instrument is used as an indicator of acceleration.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An instrument to show acceleration or deceleration of a vehicle or the like, comprising a casting formed to provide a rectangular front having a diagonally disposed recess, and a skirt forming the side walls of the instrument, a chamber formed in said casting, a transparent tube disposed in said recess and having its ends secured to said casting and in communication at opposite ends with said chamber, and liquid disposed in said tube and chamber providing a U-shaped column.

2. An indicating instrument comprising a casing having a front face, indicia on said face, flanges integral with said face and extending rearwardly from said face and forming the side walls of said instrument, a rib integral with said face and flanges and disposed between said flanges, a chamber in said rib, passages extending from said chamber toward said face, and a tube having a transparent wall disposed so that its ends are connected to said passages, said tube being disposed in a recess in said face and opposite the indicia thereon.

JACK VAN HORN WHIPPLE.